United States Patent
Cummings et al.

(10) Patent No.: US 6,679,351 B2
(45) Date of Patent: Jan. 20, 2004

(54) AIR TURBINE FOR COMBUSTION ENGINE

(75) Inventors: Craig Cummings, Park City, UT (US); Anthony J. Sutera, Midway, UT (US)

(73) Assignee: TTR HP, Inc., South Jordan, UT (US)

( * ) Notice: Subject to any disclaimer, the term of this patent is extended or adjusted under 35 U.S.C. 154(b) by 50 days.

(21) Appl. No.: 10/077,324

(22) Filed: Feb. 15, 2002

(65) Prior Publication Data

US 2002/0153197 A1 Oct. 24, 2002

Related U.S. Application Data (60) Provisional application No. 60/269,167, filed on Feb. 15, 2001.

(51) Int. Cl.[7] ............................... F01N 1/02; F01N 7/08
(52) U.S. Cl. ........................................ 181/212; 181/249
(58) Field of Search ..................... 181/249, 212, 181/214, 216, 227, 229, 232, 237–240, 247, 254–255, 258, 265, 269, 274

(56) References Cited

U.S. PATENT DOCUMENTS

| | | | | |
|---|---|---|---|---|
| 1,049,433 A | * | 1/1913 | Winslow | 181/274 |
| 2,051,675 A | * | 8/1936 | Blanchard | 181/274 |
| 2,239,549 A | * | 4/1941 | Chipley | 181/269 |
| 2,740,616 A | * | 4/1956 | Walden | 181/264 |
| 3,757,892 A | * | 9/1973 | Raudman, Jr. | 181/256 |
| 4,109,753 A | | 8/1978 | Lyman | |
| 4,222,456 A | | 9/1980 | Kasper | |
| 4,234,054 A | * | 11/1980 | Chapin | 181/252 |
| 4,317,502 A | | 3/1982 | Harris et al. | |
| 5,152,366 A | * | 10/1992 | Reitz | 181/249 |
| 5,214,254 A | | 5/1993 | Sheehan | |
| 5,496,975 A | * | 3/1996 | Wagner | 181/269 |
| 5,663,537 A | * | 9/1997 | Ko et al. | 181/228 |
| 5,902,970 A | * | 5/1999 | Ferri | 181/249 |
| 5,962,822 A | | 10/1999 | May | |
| 6,213,251 B1 | * | 4/2001 | Kesselring | 181/249 |
| 6,343,673 B1 | | 2/2002 | Chang | |

FOREIGN PATENT DOCUMENTS

| | | | | |
|---|---|---|---|---|
| GB | 2106619 A | * | 4/1983 | F41B/11/00 |
| JP | 59077020 A | * | 5/1984 | F01N/1/06 |
| JP | 61234217 A | * | 10/1986 | F01N/1/08 |

* cited by examiner

Primary Examiner—Robert Nappi
Assistant Examiner—Eduardo Colon-Santana
(74) Attorney, Agent, or Firm—John R. Thompson; Stoel Rives LLP (57) ABSTRACT

An air turbine apparatus for use with a combustion engine either as a muffler or as an air intake device is comprised of a housing defining an expansion chamber and an airfoil positioned within the housing. The airfoil includes a central aperture extending longitudinally therethrough that is in fluid communication with both the inlet and the outlet of the housing. The airfoil is configured to allow gases flowing through the inlet to flow between the outer edge of the airfoil and the housing and through the aperture of the airfoil. In addition, the air traveling through the housing is caused to spin as it travels through the housing. This rotational flow increased the rate of flow of gases through the air turbine device. A chop core is provided between the airfoil and the outlet of the housing to encourage turbulent flow of gases without restricting flow to produce a muffling effect and thus a dampening of noise from the combustion engine.

29 Claims, 11 Drawing Sheets

AIR TURBINE FOR COMBUSTION ENGINE

CROSS-REFERENCE TO RELATED APPLICATIONS

This application claims priority to U.S. patent application Ser. No. 60/269,167, filing date Feb. 15, 2001.

BACKGROUND

Field of the Invention

The present invention relates to a device for causing a vortex in the intake or exhaust of a combustion engine. The device can be used to increase air flow into the intake and to muffle the sound produced through the exhaust system of two and four stroke, gasoline or diesel engines. The present invention also relates to a device which reduces higher frequency noise levels by creating a vortex within the device. In addition, the present invention relates to a device creates little back pressure to allow substantial free-flow of exhaust through the engine, increasing horsepower and increasing gas mileage.

SUMMARY OF THE INVENTION

In accordance with the principles of the present invention, the air turbine device is comprised of an inlet and an outlet with an expansion chamber thereinbetween. The inlet is fitted with inlet convolutions or rings that create a cyclone or vortex effect in the air flow. That is the air flow is caused to spin as it passes through the convolutions. As the air flow passes the convolutions, it enters an expansion chamber. At the front of the expansion chamber is an airfoil ring which splits the air flow, first into an outer vortex with higher velocity and lower pressure, and second into an inner vortex with lower velocity and subsequently higher pressure.

An inner vortex chamber is attached to the downstream side of the airfoil ring. The inner vortex chamber extends from the back of the airfoil ring to the exit port of the air turbine device. The inner vortex chamber is provided with perforations in the form of louvers which extend inwardly into the inner vortex chamber.

The outer or expansion vortex is encouraged to enter the induction vortex chamber because the air traveling in the expansion chamber is traveling faster than the air in the inner vortex chamber. Conversely, the air in the inner vortex is encouraged to flow into the expansion chamber through the louvers provided on the interior surface of inner chamber and because the outer vortex is at a lower pressure. This vortexial flow of air and the interaction of the flow between the expansion chamber and the inner chamber causes turbulence between the two flow of air and cancels higher frequency sound (i.e., noise). As the air recombines, the air flow resonates at a much lower frequency as it passes through the outlet vortex rings or convolutions.

In another preferred embodiment, the airfoil is comprised of a frustoconical-like structure with an inner passageway longitudinally extending therethrough. The airfoil causes air passing around the airfoil to accelerate over its surface creating low pressure zones in the outer expansion chamber. The air passing through the inner passageway travels at a slower rate and is recombined with the air from the expansion chamber on the exhaust side of the airfoil. This remixing of air cause turbulence between the flows of air to have a muffling effect.

The device of the present invention may also be used on the intake side of a combustion engine to increase air flow into the air intake manifold. The air intake device includes an inlet, an expansion chamber and an outlet. An airfoil is interposed within the expansion chamber at a front end thereof. As the air is caused to spin as it enters the intake manifold of a combustion engine, the flow of air into the intake is increased. Such increase in air flow increases the burn efficiency of the engine which in turn increases fuel efficiency and horsepower.

An air turbine device in accordance with the present invention may also be configured in a similar manner with the airfoil defining an inner passageway in which vortex convolutions are provided to encourage vortex rotation of the air flow. Rather than causing turbulence between the inner and outer air flows with a chop core having a plurality of internal fins, a plurality of vanes or blades are positioned between the airfoil and the inner surface of the expansion chamber that encourage the air flow to rotate in a direction counter to the direction of rotation of the air flow through the inner passageway. As the air that passes around the airfoil recombines with the air passing through the inner passageway, turbulence is caused in the expansion chamber to cause a muffling effect in the air flow without restricting the flow of air through the device.

The output from the air turbine device in accordance with the present invention produces a sound similar to the sound produced by engines that are turbo charged, even without such turbo charging devices. This is due to the fact that the device creates and air turbine inside the air turbine device's expansion and induction chambers. This "air turbine" encourages the flow of air while providing a sound muffling effect when combined with turbulent air flow in the expansion chamber.

BRIEF DESCRIPTION OF THE DRAWINGS

The foregoing summary, as well as the following detailed description of the preferred embodiments is better understood when read in conjunction with the appended drawings. For the purpose of illustrating the invention, there is shown in the drawings embodiments that are presently preferred and which illustrate what is currently considered to be the best mode for carrying out the invention, it being understood, however, that the invention is not limited to the specific methods and instruments disclosed. In the drawings.

DETAILED DESCRIPTION OF THE PREFERRED EMBODIMENTS

Figure 1:
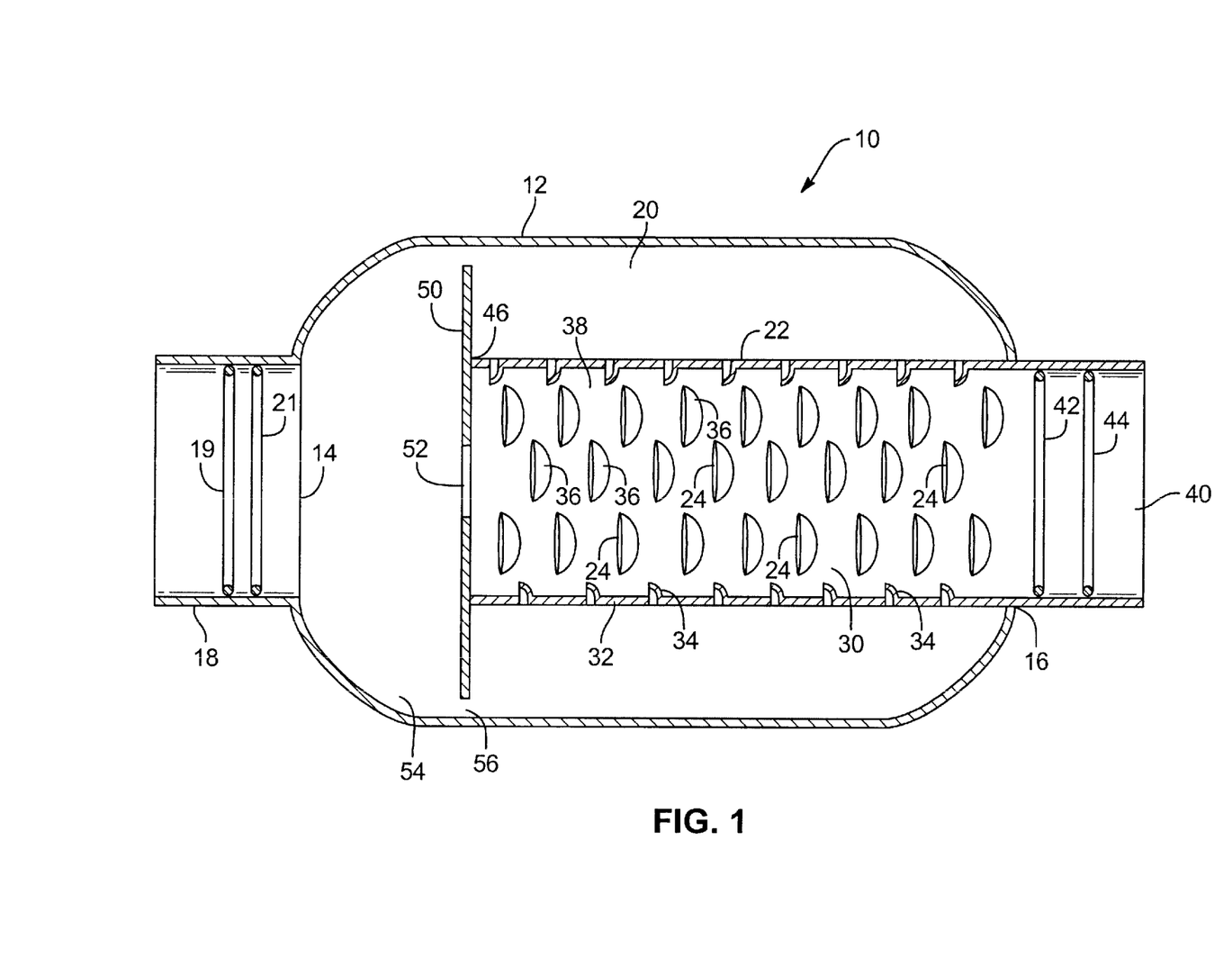
FIG. 1 is a cross-sectional side view of a first embodiment of an air turbine device in accordance with the principles of the present invention.

Referring to the drawings wherein like numerals indicate like elements throughout, there is shown in FIG. 1 an air turbine device, generally indicated at 10, in accordance with the preferred embodiment of the present invention. The air turbine device 10 is comprised of an outer housing 12 having a generally cylindrical shape. The housing 12 defines an inlet port 14 and an outlet port 16. It should be noted that while the housing 12 has a cylindrical shape, those of skill in the art will appreciate that other geometrical shapes may be feasible. An inlet tube 18 is secured to the inlet port 14 for attachment of the air turbine device 10 to an exhaust system of a vehicle (not shown). The inlet tube 18 is provided with a pair of vortex rings 19 and 21 to help form a vortexial flow of air through the air turbine device 10. The housing 12 defines an expansion chamber 20 which extends from the inlet 14 to the outlet 16.

Figure 2:
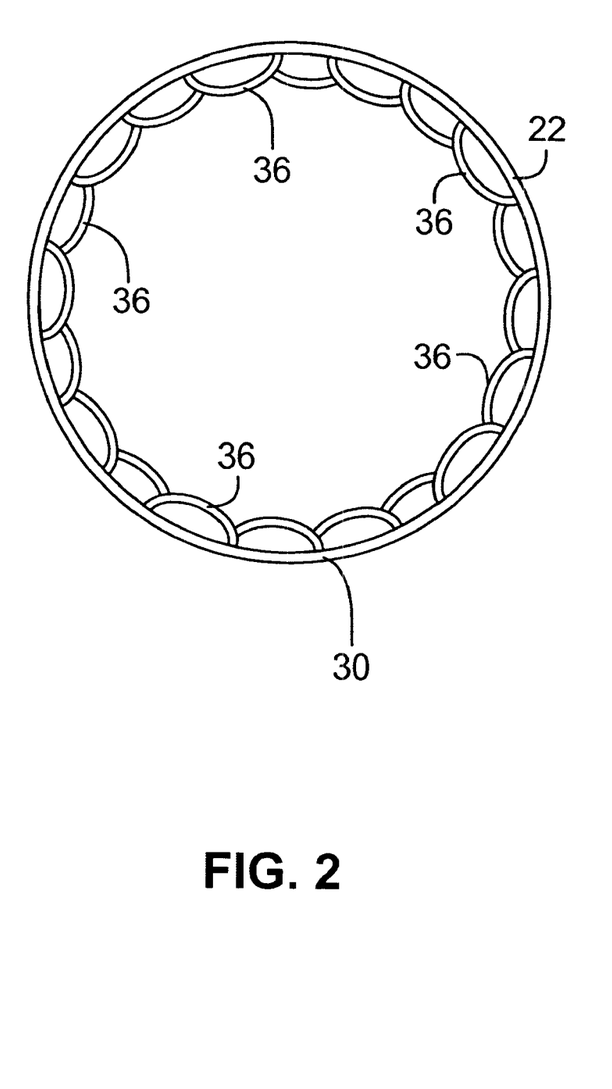
FIG. 2 is a cross-sectional end view of an induction chamber of FIG. 1.

Housed within the housing 12 is an induction tube 22 which is fixedly mounted to the outlet 16 of the housing 12. The induction tube 22 is comprised of an elongate tubular member having a plurality of perforations 24 formed therein. In the preferred embodiment, the perforations 24 are louvers which extend into the induction chamber 30 formed by the tube 22. The louvers are formed by stamping or cutting the exterior wall 32 of the tube 22 to force portions 34 of the wall 32 into the interior of the tube 22. As shown in FIG. 2, the louvers 36 are preferably formed in a helical pattern around the tube 22. It is also contemplated that one or more spiral or helical slits may be provided in the tube 22 to accomplish a similar effect. Thus, the terms louvers or perforations are intended to include such structure.

Referring again to FIG. 1, the louvers 36 extend around the interior surface 38 of the tube 22 and face in a direction so as to encourage air flowing toward the outlet 40 of the tube to flow from the tube 22 into the expansion chamber 20. A pair of vortex rings 42 and 44 are secured within the tube 22 proximate the outlet 40 of the tube 22. The vortex rings 42 and 44 provide a slight amount of back pressure to the air turbine device, which is sometimes necessary to the operation of some gas engines. In addition, the vortex rings help to maintain the vortexial flow of air as the air leaves the outlet 40.

Attached to the inlet 46 of the tube 22 is a disc-shaped member 50 which extends across the expansion chamber proximate the inlet 14 of the housing 12. The disc-shaped member 50 forms an airfoil in the path of the air flowing through the housing 12. This airfoil 22 defines a central aperture 52 which is in fluid communication with the inner vortex chamber 30. In addition, the airfoil 22 has a diameter that is less than the diameter defined by the inner surface 54 of the housing 12. As such, air entering the inlet tube 18 can either flow through the aperture 52 or through the annular space 56 formed between the airfoil 50 and the inner surface 54 of the housing 12.

Figure 3:
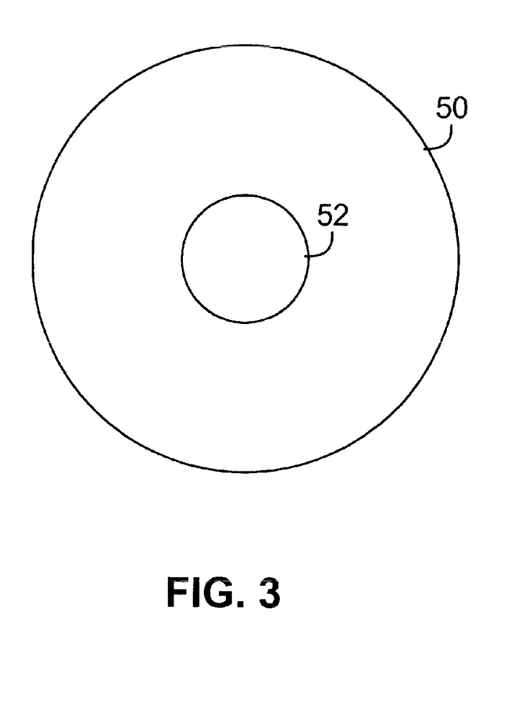
FIG. 3 is an end view of an airfoil of FIG. 1.

FIG. 3 illustrates a front view of the airfoil 50 shown in FIG. 1. The airfoil 50 is provided with the circular aperture 52 which is concentric with the airfoil 50. The size of the airfoil 50 as well as the diameter of the aperture 52 is dependent upon the flow of air from the exhaust of the combustion engine. The size of the vortex expansion chamber, however, is dependent upon the diameter of the inlet coupled thereto. The diameter of the expansion chamber is defined by 1.5 times the inlet pipe diameter. The length of the expansion chamber to accommodate the second harmonic resonance is 2.0 times the diameter of the expansion chamber. The length of the expansion chamber to accommodate the third harmonic resonance is 3.5 times the diameter of the expansion chamber. For a six inch expansion chamber diameter, the outermost airfoil diameter is approximately 5.4 inches and the diameter of the aperture or bore of the airfoil is approximately 1.6 inches. In order to create the desired vortex effect and mixing the air flows passing around and through the airfoil, the area of the annular space between the airfoil and the expansion chamber and the area of the aperture are sized to produce the most efficient flow of air through the device. In proportion, the ratio of air passing around the airfoil compared to the air passing through the airfoil for a six inch diameter expansion chamber is approximately 2.7 to 1.

Figure 4:
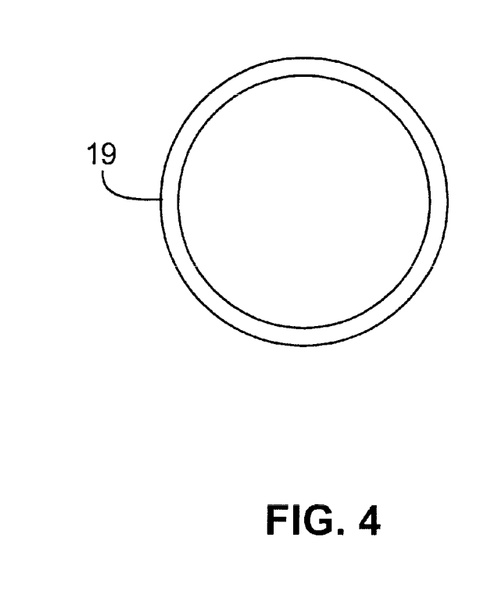
FIG. 4 is an end view of a vortex ring of FIG. 1.

FIG. 4 illustrates a vortex ring, such as vortex ring 19 shown in FIG. 1. Similar to the dimensions of the airfoil 50, the size of the vortex ring 19 is dependent upon the inner diameter of the inlet tube 18 to which the vortex ring 19 is attached. The vortex ring 19 extends into the inlet tube to form a slight constriction but not enough to cause any appreciable restriction of flow therethrough. Obviously, as shown in FIG. 1, the outer diameter of the vortex ring 19 is defined by and thus equal to the inner diameter of the inlet tube 18.

Figure 5:
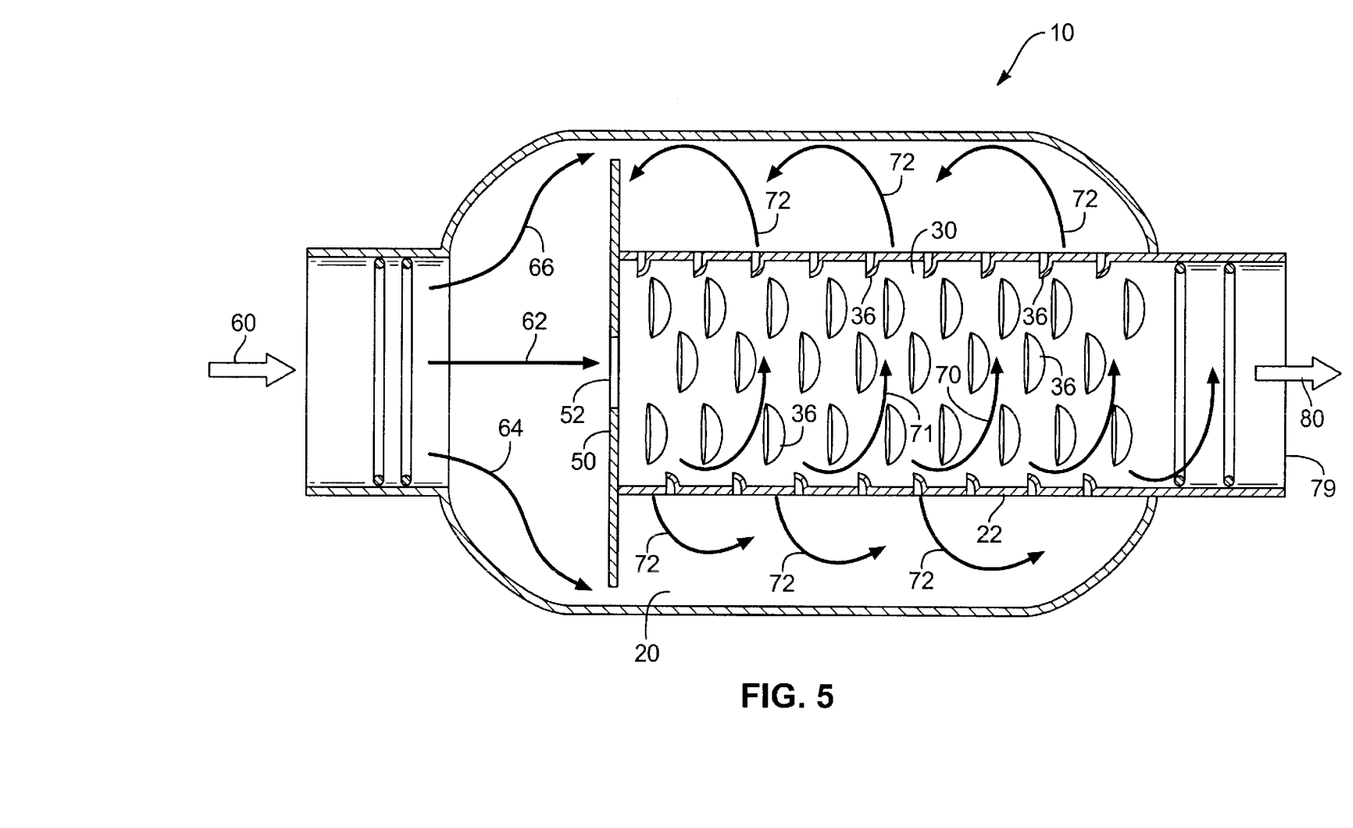
FIG. 5 is a cross-sectional side view of the air turbine device of FIG. 1 illustrating the flow of air or gases through the device.

Referring now to FIG. 5, the flow of exhaust 60 through the air turbine device 10 is illustrated. As the flow of exhaust 60 enters the expansion chamber 20, the air is directed either through 62 or around 64 and 66 the airfoil 50. The air passing around the airfoil 50 will necessarily be at a higher velocity that the air 62 that flows directly through the aperture 52. The faster moving air 64 and 66 will create a low pressure zone within the outer vortex or expansion chamber 20.

Figure 6:
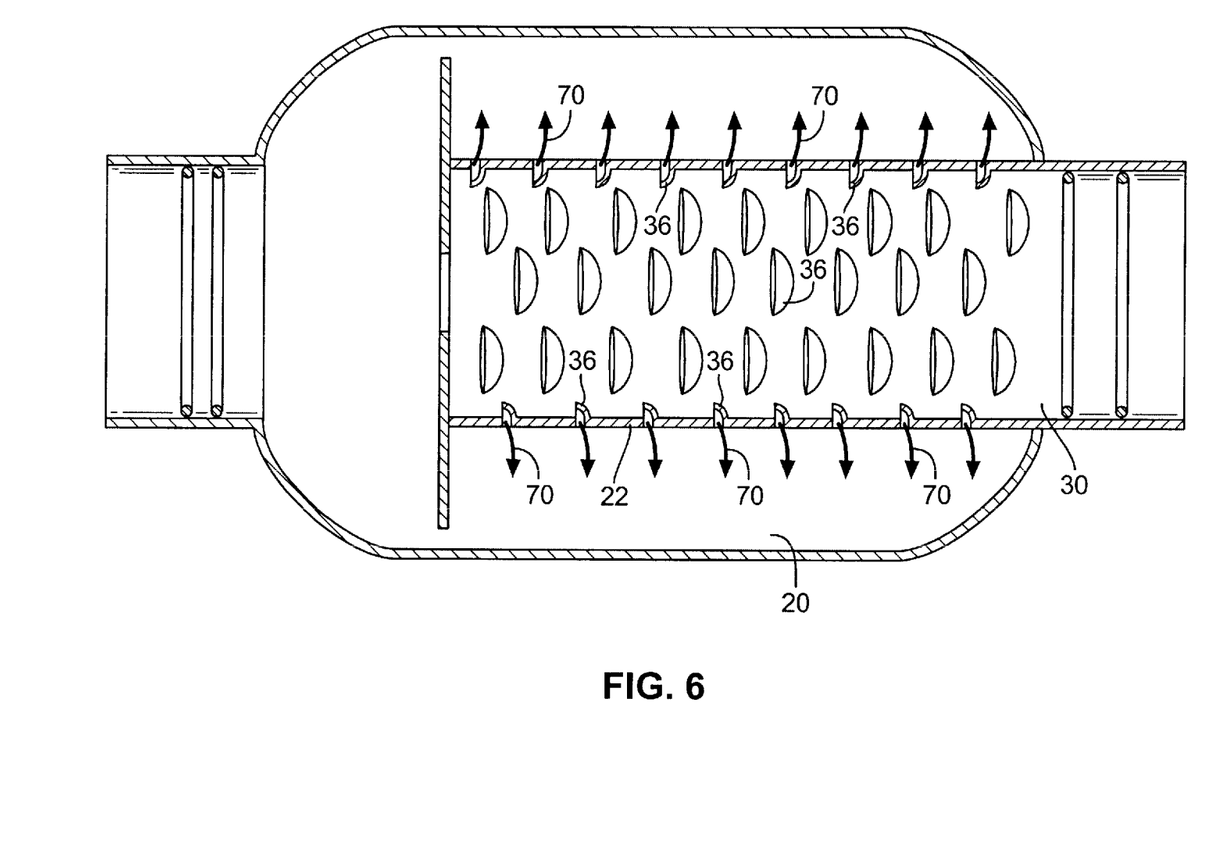
FIG. 6 is another cross-sectional side view of the air turbine device of FIG. 1 illustrating the flow of air or gases from the induction chamber into the expansion chamber.

The air 62 entering the inner vortex or induction chamber 30 will be at a lower velocity than the air in the expansion chamber 20 and thus at a higher pressure. As such, the air 71 within the induction chamber 30 will be encouraged to flow into the expansion chamber 20. As shown in FIG. 6, the flow of air 70 from the induction chamber 30 to the expansion chamber 20 is further assisted or encouraged by the louvers 36 formed into the tube 22.

Referring again to FIG. 5, the arrangement of the louvers 36 force the air 70 into a vortexial flow 72 around the tube 22. As this flow 72 reenters the inner tube 22 in order to pass out through the exit or exhaust port 79 as represented by arrow 80, the inner flow 71 of air is also encouraged into a vortexial flow. As such, both the flow of air around the tube 22 and inside the tube 22 is flowing in a vortexial manner.

Figure 7:
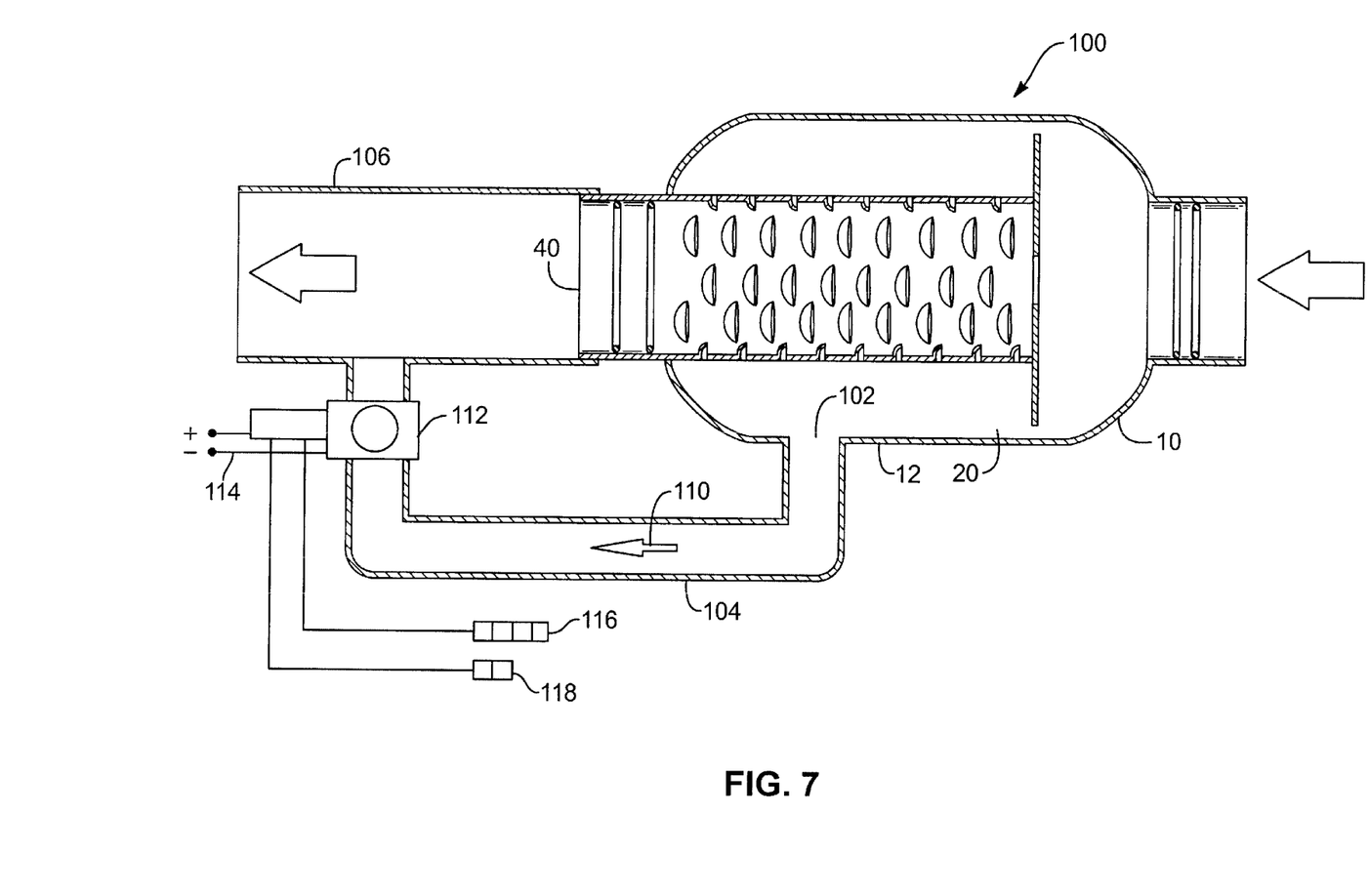
FIG. 7 is a cross-sectional side view of a second embodiment of an air turbine device in accordance with the principles of the present invention attached to an exhaust system of a combustion engine.

FIG. 7 illustrates another preferred embodiment of a tunable air turbine device, generally indicated at 100, which includes the air turbine device 10 shown in FIG. 1. The air turbine device 10 has an opening 102 formed in the housing to which a tunning chamber 104, preferably comprised of an elongate tube, is attached. The tuning chamber 104 forms a second flow passage from the air turbine device 10 but is linked to and in fluid communication with the expansion chamber 20. The tuning chamber 104 reconnects and is in fluid communication with an exhaust port 106 attached to the exit port 40 of the air turbine device 10.

The amount of air 110 flowing through the tuning chamber 104 is controlled by a valve 112, preferably an electronically controllable butterfly valve, which can partially or totally restrict the flow of air 110 through the tuning chamber 104. The butter fly valve 112 may be powered by a 12 volt power supply 114 and include a variably controllable open position gauge 116 and/or an open/close controller 118. The resonant sound emanating through the tuning chamber 104 will have had a lesser amount of high frequency noise cancelled by the air turbine device. By controlling the amount of flow 110 through the tuning chamber 104, a user can effectively control the tone of the sound from the air turbine device system 100.

Figure 8:
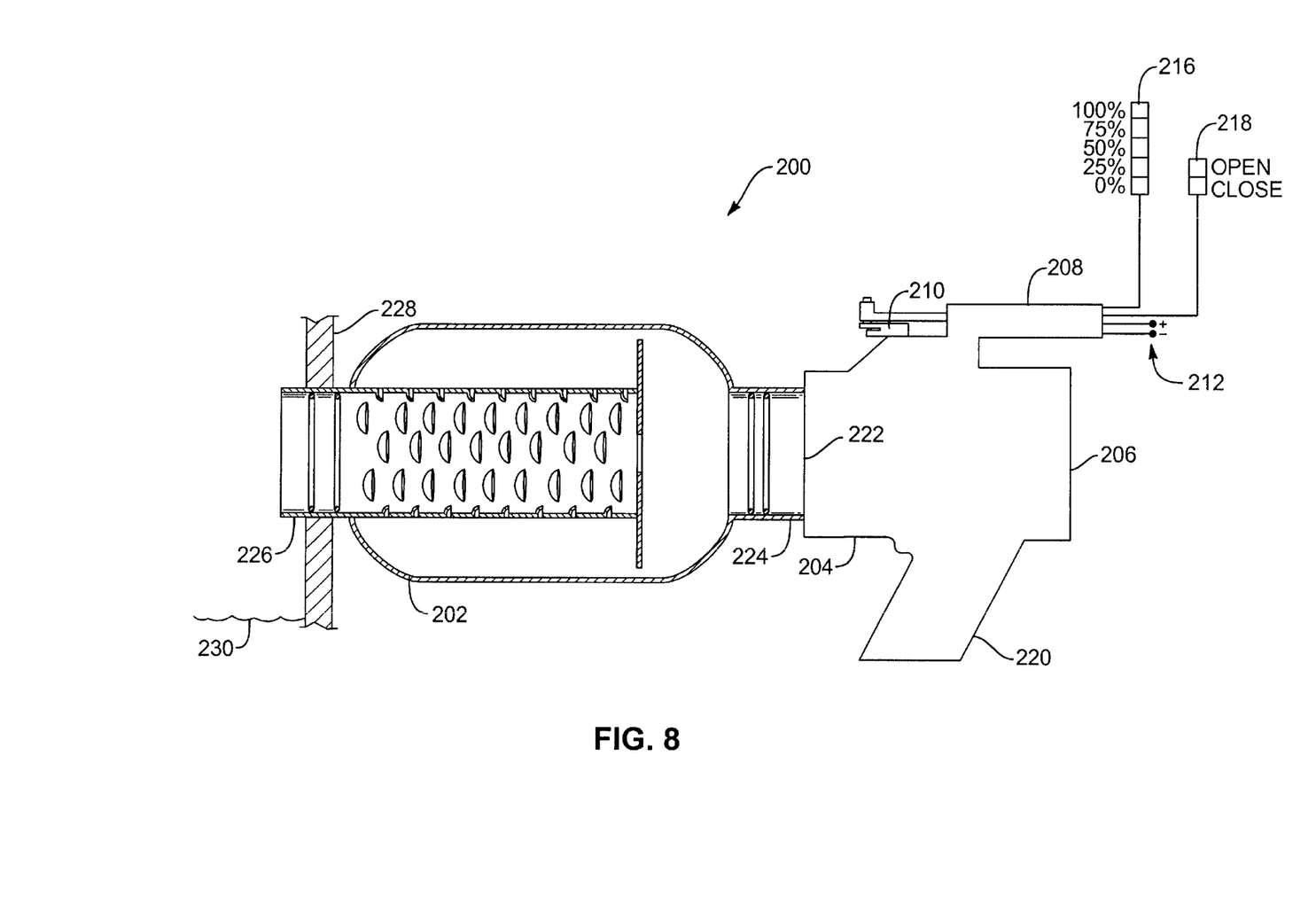
FIG. 8 is a cross-sectional side view of a third embodiment of an air turbine device in accordance with the principles of the present invention attached to an exhaust system of a combustion engine.

As shown in FIG. 8, another preferred embodiment of an air turbine device, generally indicated at 200, is adapted for use in marine applications. An air turbine device 202 having a configuration similar to that illustrated in FIG. 1 is attached to an exhaust manifold 204. The exhaust flow diverter 204 includes an exhaust inlet 206 which is coupled to the exhaust manifold (not shown) of an inboard boat motor. An actuator 208 controls a valve 210 housed within the exhaust flow diverter 204. The valve 210 is preferably a butterfly valve which can partially or totally obstruct the air flow into the air turbine device 202, as controlled by a user. Similar to the butterfly valve illustrated with respect to FIG. 7, the butterfly valve 210 may be powered by a 12 volt power supply 212 and include a variably controllable open position gauge 216 and/or an open/close controller 218. The air that is restricted by the butterfly valve 210 is diverted into the diverter outlet 220. The diverter outlet is coupled to the factory stem drive outlet (i.e., the exhaust outlet already existing on the marine vessel).

The exhaust flow diverter 204 is thus controllable to allow a portion or all of the exhaust air flow entering the exhaust inlet of the diverter to flow through the air turbine device 202. As such, the outlet 222 of the diverter 204 is coupled to the inlet 224 of the air turbine device. The outlet 226 of the air turbine device 202 is coupled or mounted to the hull 228 of the boat or marine vessel. The outlet 226 is positioned above the water line 230 so that, unlike the factory exhaust which uses the water to act as an air turbine device, the flow of exhaust out of the air turbine device 202 is not impeded by the back pressure that would otherwise be caused if the outlet 226 of the air turbine device 202 was submerged. Such a free flowing air turbine device configuration increases horse power while providing a compact air turbine device that does not add significant weight or size to an existing vessel.

Figure 9:
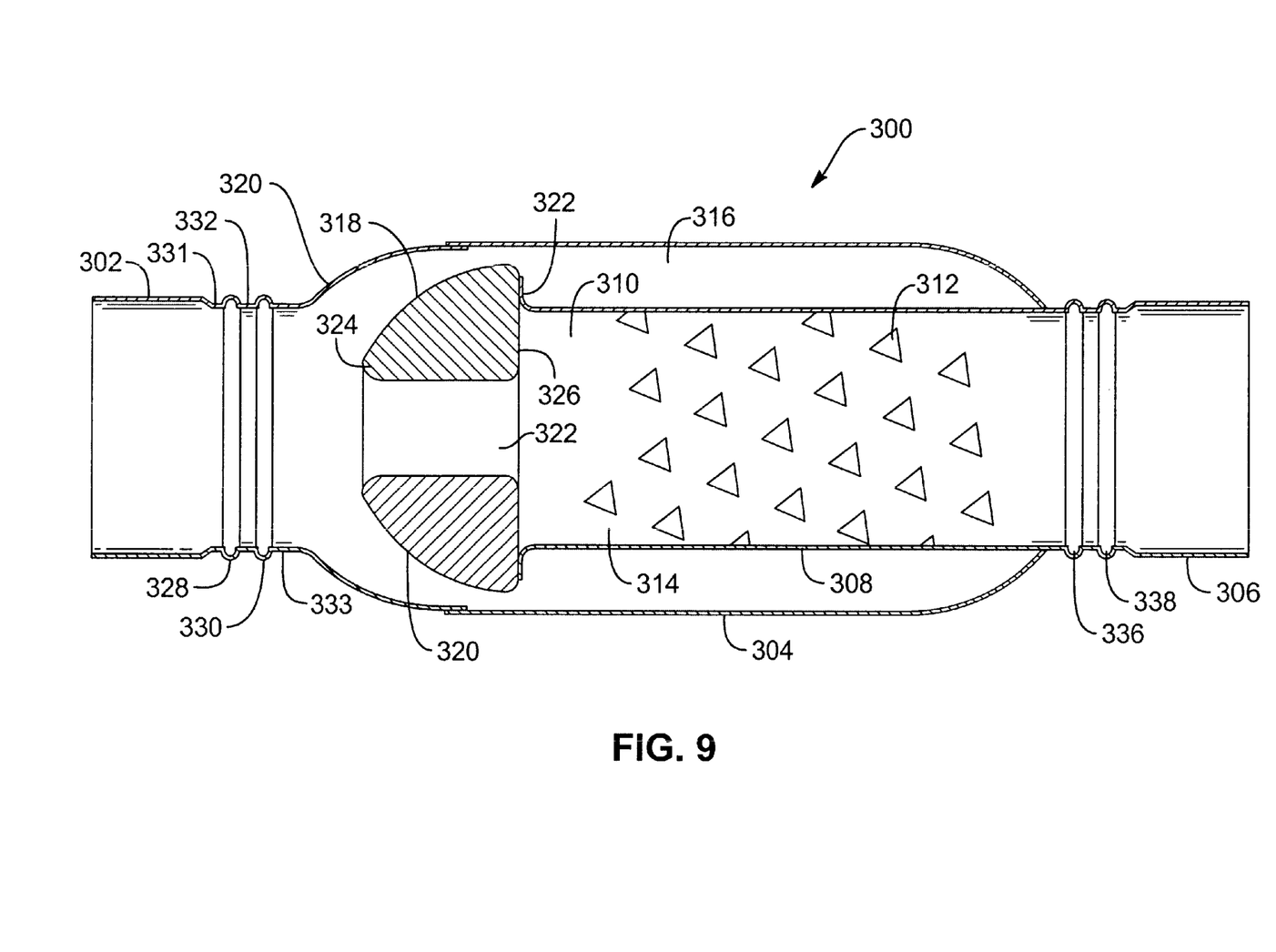
FIG. 9 is a cross-sectional side view of a fourth embodiment of an air turbine device in accordance with the principles of the present invention.

FIG. 9 illustrates another embodiment of an air turbine device, generally indicated at 300 in accordance with the principles of the present invention. Similar to other embodiments described herein, the air turbine 300 is comprised of an inlet 302, an expansion chamber outer housing 304 and an outlet 306. The inlet 302 and outlet 306 are of similar diameter, with the housing 304 having a larger diameter and interposed between the inlet and the outlet. A chop core 308 is positioned within expansion chamber and defines an induction chamber 310. The chop core 308 is provided with a plurality of louvers 312 that extend into the induction chamber 310 and are arranged along the inner wall 314 of the chop core so as to encourage rotational flow of the air or exhaust gases entering the induction chamber out into the annular expansion chamber 316 defined between chop core 308 and the expansion chamber outer housing 304. Thus, the louvers may be spirally or helically configured around the chop core 308.

An airfoil 318 is positioned in the proximal end 320 of the housing 304 and is attached to the proximal end 322 of the chop core 308. The airfoil 318 has a frustoconical shape with a curved outer surface 320 and a longitudinally extending central bore 322 extending from the proximal end 324 of the airfoil 318 to the distal end 326 and in fluid communication with the induction chamber 310. The airfoil 318 may be comprised of a ceramic material, metal or other heat resistant materials. The air foil 318 divides the air entering the device 300 through the input 302 so that a portion of the air enters the induction chamber 310 through the bore 322 while the remaining air flow enters the induction chamber from the expansion chamber 316.

One important aspect of the invention is to cause the air flow through the device to rotate into a vortex. The spinning air causes the air to flow more efficiently through the device 300. The air flow is first caused to rotate relative to the device 310 at the intake 302 by a pair of vortex convolutions 328 and 330 that are formed into the intake portion 302 of the device 300. The vortex convolutions 328 and 330 are each formed by bending, casting or otherwise forming the intake 302 to form annular recesses 331, 332 and 333 in order to form the interior annular recesses or convolutions 328 and 330. As the air flow encounters the convolutions 328 and 330 and passes through the convolutions, the air is caused to spin. The air continues to spin as it passes over and around the airfoil 318. The perforations or louvers 312 are configured to cause rotation of the air flow counter to the rotation caused by the convolutions 330 and 328 as the air is drawn by the convolutions from the induction chamber to the expansion chamber 316 through the louvers 312. This mixing of the air flow in the expansion chamber and induction chamber causes turbulence in the air flow. The result of such turbulence is a cancellation of noise otherwise present in the exhaust flow.

This turbulent flow then recombines in the outlet 306 and is again caused to spin into a vortex as it passes through a second set of convolutions 336 and 338 formed in the outlet 306 in a similar manner to the convolutions 328 and 330 formed in the intake 302. Such a vortex at the outlet 306 again encourages the flow of air out of the device 300.

The length of the expansion chamber 304 also has an effect on the noise cancellation ability of the device 300. That is, the length of the device 300 can be tuned to cancel out various noise frequencies including multiple harmonics. That is, by tuning the length of the device 300 to match the frequencies generated by a particular engine, the first, second and third harmonics can be dampened producing a more quiet running engine.

Figure 10:
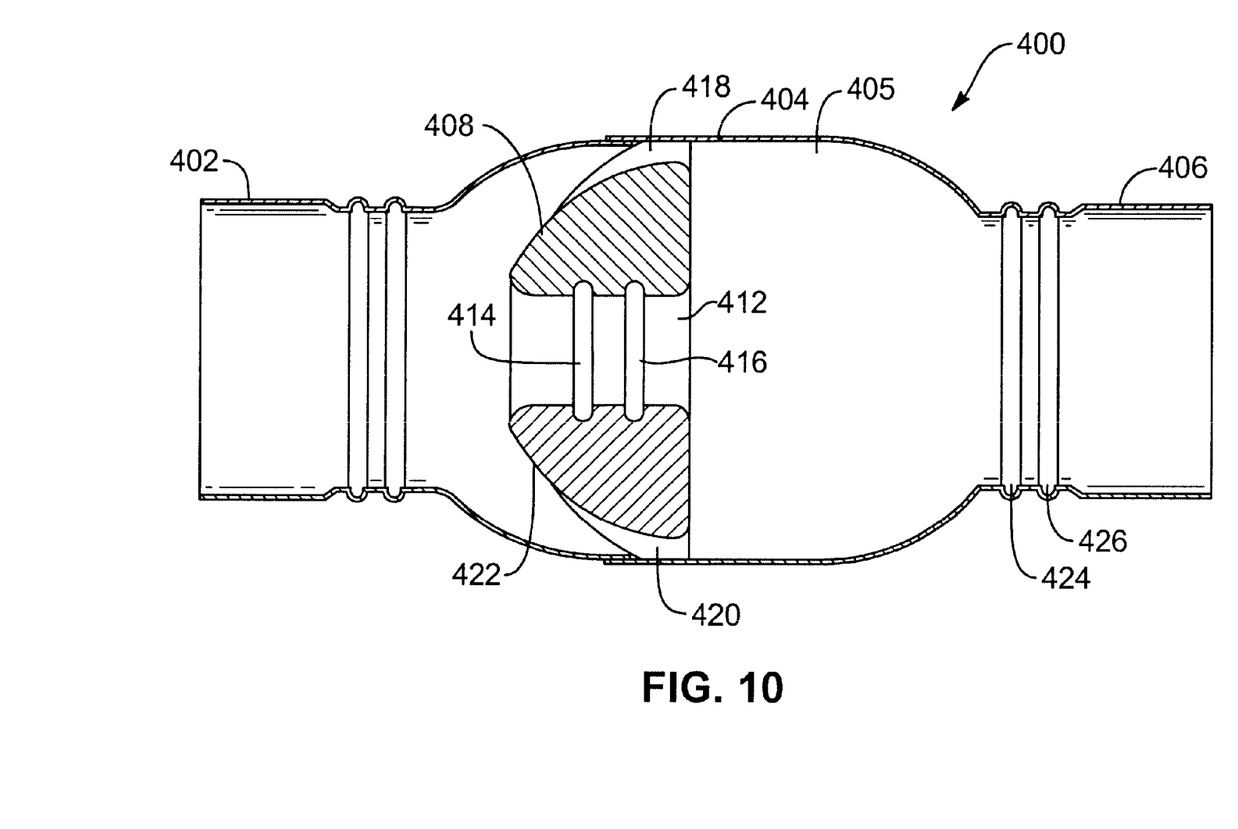
FIG. 10 is a cross-sectional side view of another embodiment of an air turbine device in accordance with the principles of the present invention.

Referring now to FIG. 10 is shown another embodiment of an air turbine device, generally indicated at 400, in accordance with the principles of the present invention. The device is comprised of an intake 402, an expansion chamber housing 404 defining an expansion chamber 405 and an exhaust port 406. Positioned within the expansion chamber 405 is an airfoil 408 that defines a longitudinally extending bore 412 and divides the air into a portion that flows around the air foil and a portion that flows through the air foil. A pair of airfoil convolutions 414 and 416 are provided in the bore 412 of the airfoil 408 to encourage vortex flow of the air through the airfoil and into the expansion chamber 405.

The airfoil 408 is concentrically centered within the expansion chamber 405 and held relative thereto with a plurality of vanes or blades 418 and 420. There may be two, three, four or more of the blades 418 and 420. The blades 418 and 420 as shown are configured to be spirally or helically oriented around the outer surface 422 of the airfoil 408 so as to cause rotation of the air flowing around the airfoil. The orientation of the blades 418 and 420 is such that the air flowing around the air foil 408 is counter rotated to the air flowing through the bore 412. As the air recombines in the expansion chamber 405, counter spinning air flows cause turbulence therein between so as to cause cancellation of noise from the engine to produce a muffling effect while allowing essentially the free flow of exhaust gases through the device 400. The air then recombines in the expansion chamber 405 and exits through the exhaust port 406 with the convolutions 424 and 426 causing the air to spin in a vortex as it exits the device 400.

Figure 11:
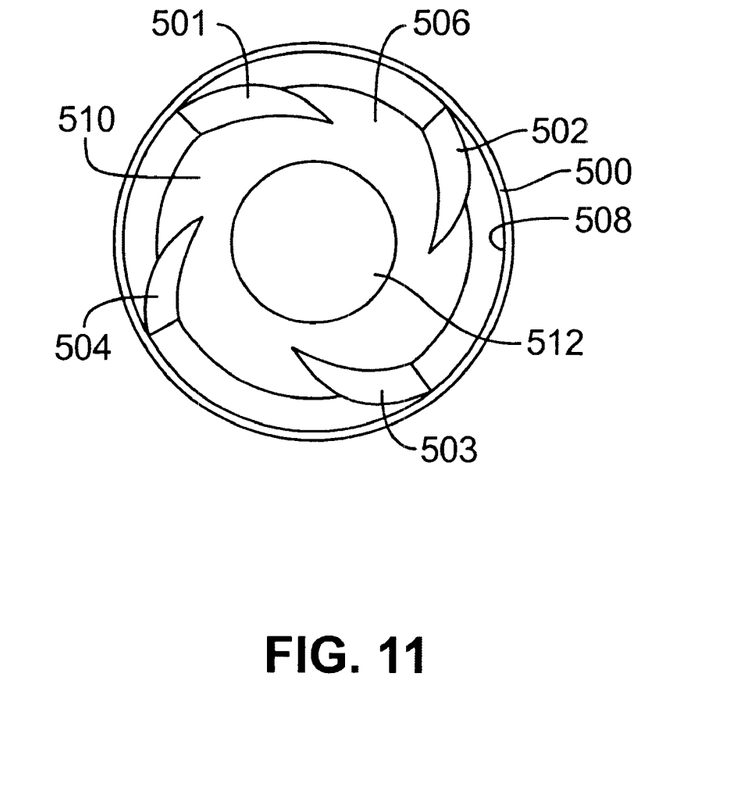
FIG. 11 is a cross-sectional end view of an expansion chamber housing an airfoil supported by a plurality of blades in accordance with the principles of the present invention.

FIG. 11 shows a cross-sectional end view of an expansion chamber housing 500 with blades 501, 502, 503 and 504 supporting an airfoil cone 506. The blades 501–504 are attached to the inner surface 508 of the housing 500 and to the outer surface 510 of the airfoil cone 506 so as to cause rotation of the air flow passing around the airfoil cone 506 in the direction of the blades 501–504. It is desirable to orient the blades 501–504 so that the air flowing over the airfoil cone 510 is spinning in a direction opposite to the rotation of the air flowing through the internal passageway 512 extending through the airfoil cone 506.

Figure 12:
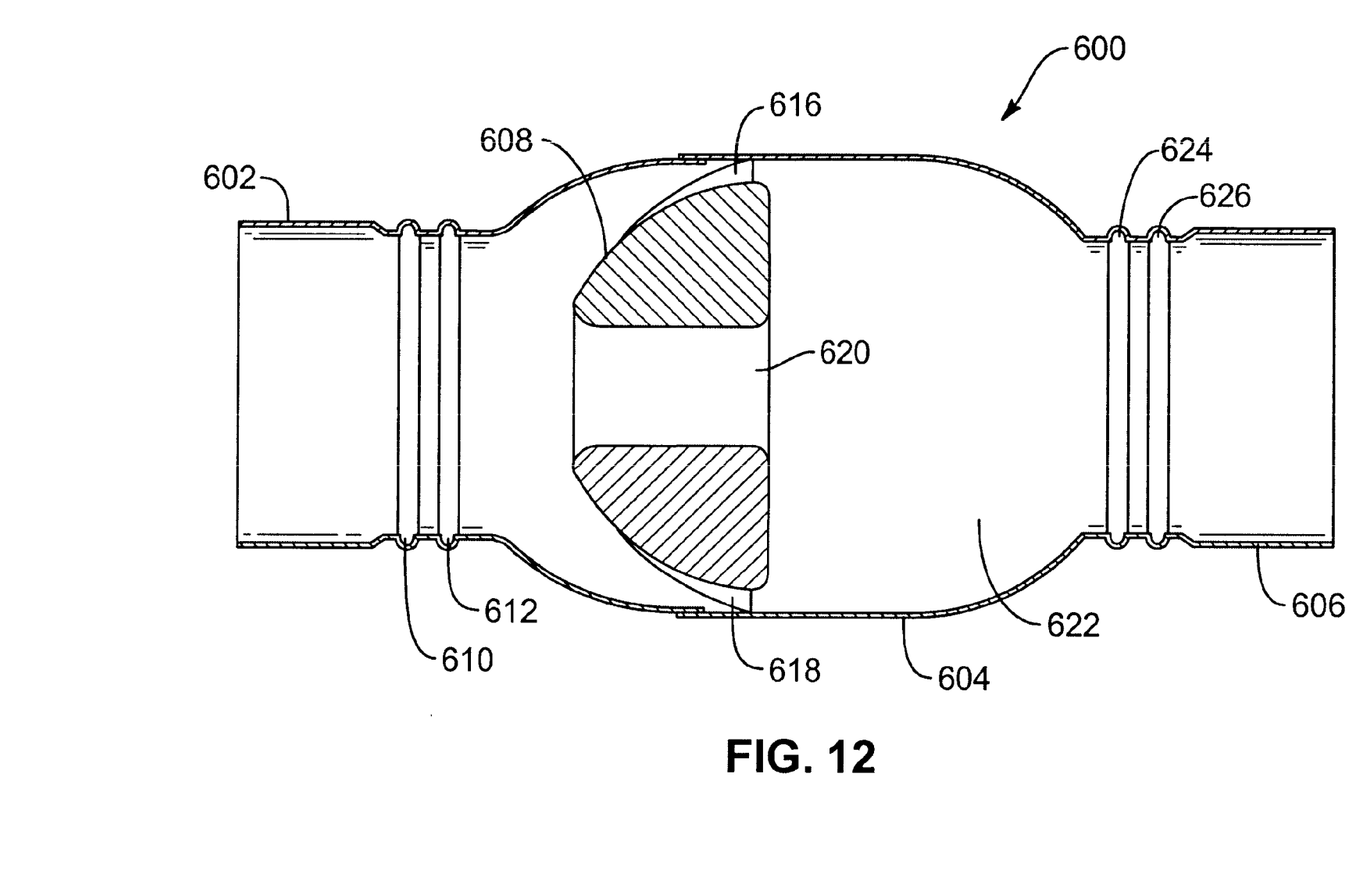
FIG. 12 is a cross-sectional side view of a fifth embodiment of an air turbine device in accordance with the principles of the present invention.

Finally, as shown in FIG. 12, the principles of the present invention may be applied to the intake of a combustion engine as well. An intake air turbine 600 is comprised of an intake port 602, an expansion chamber housing 604 and an exhaust port 606. Housed within the expansion chamber housing 604 is an airfoil 608 that divides the air flow similar to that shown in the other embodiments herein. The intake port 602 is provided with vortex convolutions 610 and 612 that cause the air flow to rotate relative thereto. As an intake device, the flow of air from the intake port 602 to the exhaust port 606 is encouraged to rotate throughout the device. That is the air flowing through the expansion chamber, both around and through the bore 620 of the airfoil, is rotated in the same direction so as to increase the flow of air through the exhaust port 606 and into the intake manifold (not shown) of a combustion engine. The blades 616 and 618 that support the airfoil 608 within the housing 604 are helically oriented around the airfoil to encourage this consistent rotational flow of air around the airfoil so as to minimize turbulence as the air flow recombines in the expansion chamber 622. In the event of any such turbulence, the exhaust port vortex convolutions 624 and 626 encourage continued and uniform vortex rotation of the air flow.

Various tests have been conducted using an air turbine device in accordance with the principle invention with surprising results. An air turbine device was installed on a Kenworth 525 CAT Cummins N14 diesel engine in a muffler configuration. That is, the air turbine device was installed on the exhaust in replacement of a stock muffler. The average gas mileage of the engine using the stock muffler was 5.7 MPG. After installation of an air turbine muffler in accordance with the present invention with no other modification to the engine the following results compiled in TABLE I were achieved.

TABLE I (Test results for Kenworth 525 CAT Cummins N14 diesel engine)

| MILES TRAVELED | FUEL USED (gal.) | FUEL MILEAGE | % GAIN |
| --- | --- | --- | --- |
| 979 | 148 | 6.61 | 15.96 |
| 941 | 150 | 6.20 | 8.77 |
| 1242 | 208 | 5.97 | 4.74 |
| 1194 | 188 | 6.35 | 11.4 |
| 1134 | 218 | 6.11 | 7.19 |
| 1007 | 166 | 6.06 | 6.32 |
| 1600 | 257 | 6.22 | 9.12 |
| 1275 | 205 | 6.24 | 9.47 |
| 1063 | 175 | 6.00 | 5.56 |
| 1071 | 170 | 6.29 | 6.61 |
| 880 | 140 | 6.28 | 10.35 |
| 1140 | 180 | 6.30 | 10.53 |
| 2035 | 311 | 6.54 | 14.74 |
| 1980 | 319 | 6.20 | 8.77 |
| 1334 | 213 | 6.26 | 9.82 |
| 1124 | 175 | 6.40 | 12.28 |
| 1401 | 225 | 6.20 | 8.77 |
| 1958 | 314 | 6.20 | 8.77 |

Based on the foregoing test results, the average fuel mileage was 6.25 MPG with an average percent gain of 9.4 percent.

A field test of a 2000 Ford Excursion powered by a 7.3 liter turbo charged Powerstroke diesel engine. The Excursion had 32,551 miles on the odometer when the test began with the test running for approximately 8,000 miles of driving. An air turbine device in accordance with the present invention was installed as a muffler on the exhaust of the engine replacing the stock muffler. The original equipment mileage was approximately 14.54 miles per gallon based upon a 6,152 mile cross-country filed test from Boise, Id. to Denver, Colo. to Milwaukee, Wis. to Nashville, Tenn. to Birmingham, Ala. and returning to Boise, Id.

After installation of the air turbine muffler of the present invention, the Excursion was driven from Salt Lake City, Utah to Boise, Id., to Portland Oreg., to Seattle, Wash. to Bellingham, Wash., back to Seattle Wash. then to Yakima, Wash. During the trip, the excursion averaged 15.97 miles per gallon. Subsequent to the above trip, the Excursion was driven 3901 miles from Salt Lake City to Rochester, N.Y. and back. This cross-country trip yielded an average of 16.59 miles per gallon.

In addition to the increase in gas mileage, the engine runs cooler with the air turbine installed and exhibits increased horse power, especially noticeable on uphill climbs and passing situations at highway speeds. Furthermore, the sound level of the exhaust is exceptional. In fact, the sound dampening aspects result in the muffling of the typical "diesel-type" engine noise not achieved by standard mufflers.

While the apparatus of the present invention has been described with reference to certain preferred embodiments to illustrate what is believed to be the best mode of the invention, it is contemplated that upon review of the present invention, those of skill in the art will appreciate that various modifications and combinations may be made to the present embodiments without departing from the spirit and scope of the invention as recited in the claims. The claims provided herein are intended to cover such modifications and combinations and all equivalents thereof. Reference herein to specific details of the illustrated embodiments is by way of example and not by way of limitation.

What is claimed is:

1. An air turbine apparatus, comprising:

a housing defining an expansion chamber;

an inlet in said housing, said inlet having a diameter less than said expansion chamber;

an outlet in said housing;

an airfoil positioned proximate to said inlet to directly receive incoming gases, said airfoil including an aperture extending longitudinally therethrough and aligned with said inlet and outlet, said airfoil positioned relative to said inlet and outlet and one another to define first and second air flow paths, said first air flow path being straight and passing through said inlet, through said aperture of said airfoil, and through said outlet, said second air flow path passing around said airfoil and then combining with said first air flow path between said airfoil and said outlet, wherein the gases flowing in said second air flow path and passing around said airfoil do so at a higher velocity and lower pressure than gases flowing through said airfoil.

2. The apparatus of claim 1, wherein said housing is substantially cylindrical in configuration.

3. The apparatus of claim 1, further including an inlet tube coupled to said inlet of said housing and further including at least one constriction within said inlet tube.

4. The apparatus of claim 1, further including an outlet tube coupled to said outlet of said housing and further including at least one constriction within said outlet tube.

5. The apparatus of claim 1, wherein said airfoil is comprised of a frustoconical-like structure.

6. The apparatus of claim 1, further comprising a tube positioned proximate said airfoil and extending through at least a portion of said housing, said tube dividing said housing into an induction chamber and an expansion chamber.

7. The apparatus of claim 6, wherein said tube includes a plurality of perforations therein to allow the gases to flow from said expansion chamber into said induction chamber.

8. The apparatus of claim 7, wherein said plurality of perforations are in the form of louvers extending inwardly into said tube for encouraging flow of gases from said induction chamber into said expansion chamber.

9. The apparatus of claim 8, wherein said louvers are helically configured around said tube to encourage vortex flow of gases.

10. The apparatus of claim 6, wherein said tube is attached to said airfoil, supporting said airfoil substantially concentrically within said housing, and attached to said outlet of said housing.

11. The apparatus of claim 6, wherein said airfoil comprises a disk-shaped member mounted to said tube, said aperture being in fluid communication with an interior of said tube, and having a size that allows gases to flow between an outer edge of said disk-shaped member and an interior surface of said housing.

12. The apparatus of claim 1, further including a plurality of blades disposed between said airfoil and an interior surface of said housing, said blades oriented to cause rotational flow of gases passing over said blades.

13. The apparatus of claim 12, wherein said blades support said airfoil substantially concentrically within said housing.

14. The apparatus of claim 1, wherein said airfoil is comprised of ceramic.

15. The apparatus of claim 1, wherein said aperture of said airfoil defines a plurality of convolutions therein.

16. The apparatus of claim 1, wherein said inlet is configured for attachment as a muffler of a combustion engine.

17. The apparatus of claim 1, wherein said output of said housing is in fluid communication with the air intake of a combustion engine.

18. An air turbine apparatus, comprising:

a housing defining an expansion chamber;

an inlet in said housing, said inlet having a diameter less than said expansion chamber;

an outlet in said housing;

an airfoil proximate to said inlet to directly receive incoming gases, said airfoil including an aperture extending longitudinally therethrough and aligned with said inlet and outlet; and a tube having a proximal end and a distal end, said proximal end of said tube coupled to said airfoil to directly receive gases passing through said aperture of said airfoil, said tube coupled to said outlet of said housing, said tube dividing at least a portion of said housing into an expansion chamber and an induction chamber and having a plurality of perforations formed therein, said airfoil positioned relative to said inlet and outlet and one another to define first and second air flow paths, said first air flow path being straight and passing through said inlet, through said aperture of said airfoil, and through said outlet, said second air flow path passing around said airfoil and then combining with said first air flow path, wherein said gases flowing in said second air flow path and passing around said airfoil do so at a higher velocity and lower pressure than gases flowing through said airfoil.

19. The apparatus of claim 18, further comprising an outlet tube coupled to said outlet of said housing and further including at least one constriction within said outlet tube.

20. The apparatus of claim 18, wherein said airfoil is comprised of a frustoconical-like structure with a narrow end of said airfoil oriented toward the inlet of said housing.

21. The apparatus of claim 18, wherein said plurality of perforations are in the form of louvers extending inwardly into said tube for encouraging flow of gases from said induction chamber into said expansion chamber.

22. The apparatus of claim 21, wherein said louvers are helically configured around said tube to encourage vortex flow of gases.

23. The apparatus of claim 18, wherein said airfoil comprises a disk-shaped member mounted to said proximal end of said tube, and having a size that allows gases to flow between an outer edge of said disk-shaped member and an interior surface of said housing.

24. The apparatus of claim 18, further including a plurality of blades disposed between said airfoil and an interior surface of said housing, said blades oriented to cause rotational flow of gases passing over said blades.

25. The apparatus of claim 18, wherein said aperture of said airfoil defines a plurality of convolutions therein for encouraging rotational flow of gases passing through said aperture.

26. An air turbine apparatus, comprising:

a housing defining an expansion chamber;

an inlet in said housing, said inlet having a diameter less than said expansion chamber;

an outlet in said housing;

an airfoil comprising a frustoconical-like structure and proximate to said inlet to directly receive incoming gases, said airfoil including an aperture extending longitudinally therethrough and aligned with said inlet and outlet, said airfoil positioned within said housing such that a narrow end of said airfoil is oriented toward the inlet of said housing, a tube having a proximal end and a distal end, said proximal end of said tube coupled to said airfoil to directly receive gases passing through said aperture of said airfoil, and said tube coupled to said outlet of said housing, said tube dividing at least a portion of said housing into an expansion chamber and an induction chamber and having a plurality of perforations formed therein said airfoil positioned relative to said inlet and outlet and one another to define first and second air flow paths, said first air flow oath being straight and passing through said inlet, through said aperture of said airfoil, and through said outlet, said second air flow path passing around said airfoil and then combining with said first air flow path, wherein said gases flowing in said second air flow path and passing around said airfoil do so at a higher velocity and lower pressure than gases flowing through said airfoil.

27. The air turbine apparatus of claim 26, further comprising an outlet tube coupled to said outlet of said housing and further including at least one constriction within said outlet tube.

28. An air turbine apparatus, comprising:

a housing defining an expansion chamber;

an inlet in said housing, said inlet having a diameter less than said expansion chamber;

an outlet in said housing;

an airfoil comprising a frustoconical-like structure and proximate to said inlet to directly receive incoming gases, said airfoil including an aperture extending longitudinally therethrough and aligned with said inlet and outlet, said airfoil positioned within said housing such that a narrow end of said airfoil is oriented toward the inlet of said housing, wherein said aperture of said airfoil defines a plurality of convolutions therein for encouraging rotational flow of gases passing through said aperture; and a plurality of blades disposed between said airfoil and an interior surface of said housing, said blades oriented to cause rotational flow of gases passing over said blades said airfoil positioned relative to said inlet and outlet and one another to define first and second air flow paths, said first air flow path being straight and passing through said inlet, through said aperture of said airfoil, and through said outlet, said second air flow oath passing around said airfoil and then combining with said first air flow path between said airfoil and said outlet, wherein the gases flowing in said second air flow path and passing around said airfoil do so at a higher velocity and lower pressure than gases flowing through said airfoil.

29. The air turbine apparatus of claim 28, further comprising an outlet tube coupled to said outlet of said housing and further including at least one constriction within said outlet tube.

* * * * *